United States Patent
Glöckner et al.

(10) Patent No.: US 7,759,424 B2
(45) Date of Patent: *Jul. 20, 2010

(54) RADIATION CURABLE MODIFIED, UNSATURATED, AMORPHOUS POLYESTERS

(75) Inventors: Patrick Glöckner, Haltern am See (DE); Lutz Mindach, Bochum (DE)

(73) Assignee: Evonik Degussa GmbH, Essen (DE)

( * ) Notice: Subject to any disclaimer, the term of this patent is extended or adjusted under 35 U.S.C. 154(b) by 202 days.

This patent is subject to a terminal disclaimer.

(21) Appl. No.: 11/577,139

(22) PCT Filed: Aug. 16, 2005

(86) PCT No.: PCT/EP2005/054021

§ 371 (c)(1),
(2), (4) Date: Jan. 14, 2008

(87) PCT Pub. No.: WO2006/040210

PCT Pub. Date: Apr. 20, 2006

(65) Prior Publication Data

US 2009/0035595 A1    Feb. 5, 2009

(30) Foreign Application Priority Data

Oct. 12, 2004  (DE) .................. 10 2004 049 544

(51) Int. Cl.
C08L 67/00 (2006.01)
B32B 27/06 (2006.01)

(52) U.S. Cl. .......................................... 525/43; 428/480

(58) Field of Classification Search .............. 525/43
See application file for complete search history.

(56) References Cited

U.S. PATENT DOCUMENTS

| | | | |
|---|---|---|---|
| 4,322,504 A * | 3/1982 | Wagner et al. | 525/7.1 |
| 5,753,722 A * | 5/1998 | Itokawa et al. | 522/83 |
| 6,552,154 B1 | 4/2003 | Kohlstruck et al. | |
| 6,730,628 B2 | 5/2004 | Kohlstruck et al. | |
| 6,794,482 B2 | 9/2004 | Gloeckner et al. | |
| 6,797,787 B2 | 9/2004 | Scholz et al. | |
| 6,800,714 B2 | 10/2004 | Kohlstruck et al. | |
| 6,881,785 B2 | 4/2005 | Gloeckner et al. | |
| 7,005,002 B2 | 2/2006 | Glockner et al. | |
| 7,033,522 B2 | 4/2006 | Jonderko et al. | |
| 7,101,958 B2 | 9/2006 | Gloeckner et al. | |
| 7,135,522 B2 * | 11/2006 | Gloeckner et al. | 524/591 |
| 7,138,465 B2 | 11/2006 | Gloeckner et al. | |
| 7,144,975 B2 * | 12/2006 | Gloeckner et al. | 528/302 |
| 2002/0058146 A1 * | 5/2002 | Schwalm et al. | 428/423.1 |
| 2003/0130416 A1 * | 7/2003 | Flosbach et al. | 524/801 |
| 2004/0122172 A1 | 6/2004 | Gloeckner et al. | |
| 2005/0010016 A1 | 1/2005 | Glockner et al. | |
| 2005/0043501 A1 | 2/2005 | Glockner et al. | |
| 2005/0080222 A1 | 4/2005 | Andrejewski et al. | |
| 2005/0124716 A1 | 6/2005 | Gloeckner et al. | |
| 2006/0074217 A1 | 4/2006 | Gloeckner et al. | |
| 2007/0123661 A1 | 5/2007 | Glockner et al. | |

FOREIGN PATENT DOCUMENTS

| | | |
|---|---|---|
| EP | 0 424 745 | 5/1991 |
| EP | 1 336 629 | 8/2003 |
| EP | 1 398 337 | 3/2004 |

OTHER PUBLICATIONS

U.S. Appl. No. 12/440,927, filed Mar. 12, 2009, Spyrou, et al.
U.S. Appl. No. 11/993,903, filed Dec. 26, 2007, Spyrou, et al.
U.S. Appl. No. 12/158,800, filed Jun. 23, 2008, Gloeckner, et al.
U.S. Appl. No. 12/159,097, filed Jun. 25, 2008, Gloeckner, et al.
U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 11/577,955, filed Apr. 25, 2007, Gloeckner, et al.
U.S. Appl. No. 11/631,392, filed Dec. 29, 2006, Gloeckner, et al.
U.S. Appl. No. 11/577,415, filed Apr. 18, 2007, Gloeckner, et al.
U.S. Appl. No. 11/574,197, filed Feb. 23, 2007, Gloeckner, et al.
U.S. Appl. No. 10/586,587, filed Jul. 20, 2006, Gloeckner, et al.
U.S. Appl. No. 11/587,792, filed Oct. 27, 2006, Gloeckner, et al.
U.S. Appl. No. 11/573,212, filed Feb. 5, 2007, Gloeckner, et al.

(Continued)

Primary Examiner—Ling-Siu Choi
Assistant Examiner—Hui Chin
(74) Attorney, Agent, or Firm—Oblon, Spivak, McClelland, Maier & Neustadt, L.L.P.

(57) ABSTRACT

The invention relates to a radiation-curable adhesion-promoting composition comprising modified unsaturated amorphous polyesters and a process for preparing it and also provides for the use thereof in radiation-curable systems.

42 Claims, No Drawings

OTHER PUBLICATIONS

U.S. Appl. No. 11/632,303, filed Jan. 12, 2007, Andrejewski, et al.
U.S. Appl. No. 11/574,113, filed Feb. 22, 2007, Gloeckner, et al.
U.S. Appl. No. 11/814,306, filed Jul. 19, 2007, Gloeckner, et al.
U.S. Appl. No. 11/917,104, filed Dec. 10, 2007, Vey, et al.
U.S. Appl. No. 11/909,098, filed Sep. 19, 2007, Spyrou, et al.
U.S. Appl. No. 11/911,394, filed Oct. 12, 2007, Becker, et al.

* cited by examiner

RADIATION CURABLE MODIFIED, UNSATURATED, AMORPHOUS POLYESTERS

The invention relates to radiation-curably modified unsaturated amorphous polyesters, to a process for preparing them and to their use, especially as adhesion-promoting additives for radiation-curable adhesives and coating materials.

Radiation-curable coating materials have increasingly gained in importance within recent years, owing to the low VOC volatile organic compounds) content of these systems. The film-forming components in the coating material are of relatively low molecular mass and hence of low viscosity, so that there is no need for high fractions of organic solvents. Durable coatings are obtained by the formation, following application of the coating material, of a high molecular mass, polymeric network by means of cross inking reactions initiated, for example, by UV light or by electron beam. Formation of the network results in volume contraction, which is cited in the literature as a reason for the sometimes poor adhesion of radiation-curable coating materials to different substrates [Surface Coatings International Part A, 2003/06, pp. 221-228].

Unsaturated polyester resins (UP resins) are known. They are prepared by condensing saturated and unsaturated dicarboxylic acids or their anhydrides with diols. Their properties depend largely on the identity and proportion of the starting materials.

The carriers of the polymerizable double bonds that are usually used are $\alpha,\beta$-unsaturated acids, primarily maleic acid and/or its anhydride, or fumaric acid; unsaturated diols are of minor importance. The greater the double bond content, i.e., the shorter the distance between the double bonds in the chain molecules, the more reactive the polyester resin. It polymerizes rapidly, with substantial production of heat and a high level of volume contraction, to give a highly crosslinked end product which, as a result, is comparatively brittle. For this reason the reactive double bonds in the polyester molecular are "diluted" by incorporating saturated aliphatic or aromatic dicarboxylic acids in the condensation. Straight-chain and/or branched diols are used as alcohol components. The individual types of UP resin differ not only in the components used to prepare them but also in the proportion of saturated to unsaturated acids, which determines the crosslinking density during polymerization, the degree of condensation, i.e., the molar mass, the acid number and OH number, i.e., the nature of the end groups in the chain molecules, the monomer content, and the nature of the additives (Ullmann's Encyclopedia of Industrial Chemistry, VOL A21, p. 217 ff., 1992).

UP resins based on Dicidol as diol component are known for example from DE 953 117, DE 22 45 110 DE 27 21 989, EP 0 114 208, and EP 0 934 988.

The use of unsaturated polyester resins for promoting adhesion is known for example from DE 24 09 800, EP 0 114 208, and EP 0 934 988.

DE 953 117 describes a process for preparing unsaturated polyesters which comprises reacting unsaturated dicarboxylic acids with polycyclic, polyhydric alcohols whose hydroxyl groups are distributed over different rings of a ring system which advantageously is a fused ring system. These polyesters can be polymerized with vinyl compounds such as styrene, alkylstyrene, chlorostyrene, vinylnaphthalene and vinyl acetate to give tack-free films. In contrast to the Dicidol mixture used in the present invention and made up of the isomeric compounds 3,8-bis(hydroxy-methyl)tricyclo[$5.2.1.0^{2,6}$]decane, 4,8-bis(hydroxy-methyl)tricyclo[$5.2.1.0^{2,6}$]decane and 5,8-bis(hydroxy-methyl)tricyclo[$5.2.1.0^{2,6}$]decane, DE 953 117 uses merely an undefined diol with a hypothesized structure, similar to Dicidol. Furthermore, the vinyl compounds optionally used therein are compounds containing only a double bond, but not an acrylic double bond in the present invention the viscosity is reduced using components which derive from acrylic acid, methacrylic acid and/or derivatives thereof and which with particular preference possess at least two acrylic double bonds. Aromatic vinyl compounds as described in DE 953 117 may have deleterious effects on properties such as, for example, resistance properties, examples being weathering stabilities, which is why they are hardly used in high-quality adhesives and/or coating materials. As in-depth in-house experiments have shown, moreover, using resin-vinyl monomer compositions as described in DE 953 117, an improvement only in the freedom from tack is achieved. The distinguishing feature of the compounds prepared in the present invention is that the adhesion of coating materials is improved in conjunction with improved corrosion control, greater hardness, improved gloss and polymer content for given coating-material or adhesive viscosity, and also low volume contraction during crosslinking, and effective color stability of the crosslinked polymer.

DE 22 45 110 describes polyester materials made up of unsaturated polyesters, vinyl monomers, activators and adjuvants for producing coatings which can be cured by means of IR radiation, and which are intended to improve the sandability, curing properties and stackability. In addition to the remarks made in relation to DE 953 117, the present invention is concerned with UV- and/or electron-beam-curing adhesive and coating materials systems.

The compounds which are described in DE 27 21 989 are amenable only to crosslinking with amino resins. The polyester framework described therein possesses exclusively saturated character. Crosslinking via free radical polymerization which can be initiated by radiation energy is not a possibility. Moreover it is known that the high fractions of terephthalic acid used in DE 27 21 989 impact negatively on resistance properties such as, for example, weathering stability properties.

The resins claimed in DE-A 102 12 706, EP 0 114 208 and EP 0 934 988 are likewise not suitable for use in radiation-curing coating materials.

WO 89/07622 describes radiation-resistant, acrylstyrene-containing polyesters and polycarbonates, which could where appropriate contain Dicidol, for the packaging of, for example, foodstuffs such as fruit juices, soft drinks, wine, etc. The unsaturated polyesters on which the present invention is based are free from acylstyryl units and moreover, are radiation-curing.

Compounds which are likewise not radiation-crosslinking are described in DE 102 05 065. The polyester resins used therein contain, instead of the bis(hydroxymethyl)tricyclopentadiene derivatives used in the present invention, only dicyclopentadienes, which are not amenable to direct esterification. Consequently it is necessary to use reactors for the preparation that are particularly pressure-resistant and are therefore highly priced, which is not advisable from an economic standpoint.

DE 10 2004 031 759.3 describes solutions of unsaturated polyesters in reactive diluents with Dicidol in the alcohol component. These unsaturated polyesters are able to crosslink exclusively via the double bonds of the unsaturated carboxylic acids under radiation induction. It is known that unsaturated polyesters of this kind have a relatively low reactivity with respect to radiation-induced crosslinking reactions, which is why the fraction of unsaturated polyesters containing exclusively unsaturated dicarboxylic acids in the polymer backbone is increasingly on the retreat for radiation-curable coating materials, on economic grounds, such as insufficient throughput times, for example. Furthermore, because of the low reactivity it is not possible to obtain polymer networks, by radiation-induced crosslinking, that satisfy very exacting resistance requirements (with respect to solvents or chemicals for example). A chemical modification to these polyesters in order to raise their reactivity with respect to radiation-induced crosslinking reactions, as is claimed in the present invention has not been described.

It was an object of the present invention to find an adhesion-promoting composition which enhances the properties of radiation-curable adhesives and coating materials, such as the adhesion of coating materials, for example, and at the same time exhibits high corrosion control, high hardness, improved coating gloss and low coating-material viscosity and also a lower volume contraction during crosslinking. At the same time the reactivity toward the radiation-induced crosslinking reaction ought to be very high.

It was surprising that this object can be achieved in accordance with the claims of the patent through the use of radiation-curably modified unsaturated amorphous polyesters essentially consisting of A) at least one unsaturated amorphous polyester composed of at least one α,β-unsaturated dicarboxylic acid component and an alcohol component the alcohol component being composed of a Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, it being possible for each isomer to be present in the mixture in a fraction of from 20% to 40%, sum of the three isomers making from 90% to 100% and said mixture being present at not less than 5% in the alcohol component of the polyester; and B) at least one compound which has at least one ethylenically unsaturated moiety with at the same time at least one moiety that is reactive toward A), from 2 to 100 mol % preferably from 5 to 100 mol % and more preferably from 10 to 100 mol % of the OH groups of component A) being reacted with component B).

The invention accordingly provides radiation-curably modified unsaturated amorphous polyesters essentially consisting of A) at least one unsaturated amorphous polyester composed of at least one α,β-unsaturated dicarboxylic acid component and an alcohol component, the alcohol component being composed of a Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, it being possible for each isomer to be present in the mixture in a fraction of from 20% to 40%, the sum of the three isomers making from 90% to 100% and said mixture being present at not less than 5% in the alcohol component of the polyester; and B) at least one compound which has at least one ethylenically unsaturated moiety with at the same time at least one moiety that is reactive toward A), from 2 to 100 mol % preferably from 5 to 100 mol % and more preferably from 10 to 100 mol % of the OH groups of component A) being reacted with component B).

The invention additionally provides for the use of radiation-curably modified unsaturated amorphous polyesters essentially consisting of A) at least one unsaturated amorphous polyester composed of at least one α,β-unsaturated dicarboxylic acid component and an alcohol component, the alcohol component being composed of a Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, it being possible for each isomer to be present in the mixture in a fraction of from 20% to 40%, the sum of the three isomers making from 90% to 100% and said mixture being present at not less than 5% in the alcohol component of the polyester; and B) at least one compound which has at least one ethylenically unsaturated moiety with at the same time at least one moiety that is reactive toward A), from 2 to 100 mol % preferably from 5 to 100 mol % and more preferably from 10 to 100 mol % of the OH groups of component A) being reacted with component B), as a main, base or additional component in coating materials, adhesives, printing and other inks, polishes, gazes, pigment pastes, filling compounds, cosmetics articles and/or sealants and insulants, particularly for the purpose of enhancing the adhesion properties, loss, solvent resistance, chemical resistance and hardness.

It has been found that this composition is universally compatible with further constituents of radiation-curable coating materials and/or adhesives and/or sealants. By way of example the compositions of the invention can be mixed with acrylated polyesters, polyacrylates, polyester-urethanes, epoxy acrylates and/or polyether acrylates and also with alkyd resins, ketone-formaldehyde resins, ketone resins and/or unsaturated polyesters.

The compositions of the invention can be used for example as binders in radiation-curing coating materials and through free-radical polymerization form corrosion-resistant coatings. The effective adhesion and the capacity to undergo crosslinking reactions predestine the resins of the invention for corrosion control. Additionally there is an improvement in adhesion to different plastics. Besides the increase in adhesion there is also an improvement in the intercoat Coating materials comprising an additive according to the invention are also notable for high gloss and effective flow. Owing to the high reactivity of the products according to the invention, their use in sectors in which high belt speeds in the course of curing are necessary is advantageous.

The radiation-curably modified unsaturated amorphous polyesters are used in particular in radiation-curing coating materials, adhesives, lamination systems, printing and other inks, polishes, glazes, pigment pastes, filling compounds, cosmetics articles, packaging materials and/or sealants and insulants, particularly for the purpose of enhancing the adhesion properties and the hardness. They result in very good adhesion properties to different substrates such as, for example, metals, mineral substrates, plastics such as polyethylene, polypropylene or polycarbonate, polymethyl methacrylate and ABS, for example, and also to glass, paper, wood and ceramic.

The radiation-curable adhesion-promoting products of the invention, comprising modified unsaturated amorphous polyesters, are described in greater detail below.

The unsaturated amorphous polyester resins of component A) are obtained by reacting an alcohol component and an acid component.

As the alcohol component use is made in accordance with the invention of a Dicidol mixture of the isomeric compounds 3,8-bis(hydroxymethyl)tricyclo[5.2.1.0$^{2,6}$]-decane, 4,8-bis(hydroxymethyl)tricyclo[5.2.1.0$^{2,6}$]decane and 5,8-bis(hydroxymethyl)tricyclo[5.2.1.0$^{2,6}$]decane, it being possible for each isomer to be present in the mixture in a fraction of from 20% to 40%, the sum of the three isomers making from 90% to 100%, preferably from 95% to 100% and said mixture being present at not less than 5% in the alcohol component of the polyester. The isomer content of the Dicidol mixture can be determined qualitatively and quantitatively by means, for example, of GC analysis or quantitatively by separation by means of preparative GC or HPLC with subsequent NMR spectroscopy. All of the corresponding isomers of Dicidol in position 9 are suitable in exactly this way, but owing to the mirror symmetry of the aforementioned isomers, such as the cis and trans isomers as well, they cannot be differentiated under normal circumstances in practice.

The Dicidol mixture may further contain up to 10% of other isomers of Dicidol and/or trimeric and/or higher isomeric diols of the Diels-Alder reaction product of cyclopentadiene. With preference the alcohol component is composed of 20%, 50%, preferably 90%, more preferably 100% Dicidol mixture, this mixture with particular preference including from 95% to 100% of the abovementioned three isomeric compounds.

Besides the Dicidol mixture the alcohol component may comprise further linear and/or branched, aliphatic and/or cycloaliphatic and/or aromatic diols and/or polyols. Preferred additional alcohols used are ethylene glycol, 1,2- and/or 1,3-propanediol, diethylene, dipropylene, triethylene or tetraethylene glycol, 1,2- and/or 1,4-butanediol, 1,3-butyl-ethylpropanediol, 1,3-methylpropanediol, 1,5-pentanediol cyclohexanedimethanol, glycerol, hexanediol, neopentyl glycol, trimethylolethane, trimethylolpropane and/or pentaerythritol and also bisphenol A, B, C and/or F, norbornylene glycol, 1,4-benzyldimethanol and -diethanol, and 2,4-dimethyl-2-ethylhexane-1,3-diol.

The unsaturated amorphous polyester resins contain as starting acid component at least one $\alpha,\beta$-unsaturated dicarboxylic acid. Preferably the unsaturated polyester resins contain citraconic, fumaric, itaconic, maleic and/or mesaconic acid.

It is also possible in addition for aromatic and/or aliphatic and/or cycloaliphatic monocarboxylic and/or dicarboxylic and/or polycarboxylic acids to be present, such as phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid and tetrahydrophthalic acid, dodecanedioic acid, adipic acid azelaic acid, isononanoic acid, 2-ethylhexanoic acid, pyromellitic acid and/or trimellitic acid anhydride), for example. Preference is given to hexahydrophthalic acid, tetrahydrophthalic acid, dodecanedioic acid, adipic acid, azelaic acid, trimellitic acid (anhydride) and/or phthalic acid (anhydride).

The acid component may be composed in whole or in part of anhydrides and/or alkyl esters, preferably methyl esters.

Generally speaking the alcohol component is present in a molar ratio of from 0.5 to 2.0:1 with respect to the acid component, preferably from 0.8 to 1.5:1. With particular preference the reaction of the alcohol component takes place in a molar ratio of from 1.0 to 1.1:1 with respect to the acid component The unsaturated amorphous polyesters can have an acid number of between 1 and 200 mg KOH/g, preferably between 1 and 100, more preferably between 1 and 50 mg KOH/g, and also an OH number of between 1 and 200 mg KOH/g, preferably between 1 and 100 and more preferably between 1 and 50 mg KOH/g.

The glass transition temperature, Tg, of the radiation-curably modified unsaturated amorphous polyesters varies from $-30$ to $+100°$ C., preferably from $-20$ to $+80°$ C., more preferably from $-10$ to $+60°$ C.

In one preferred embodiment I the unsaturated polyesters (UP resins) are composed of an alcohol component with at least 90%, preferably 95%, more preferably 100% of the Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5-bis(hydroxymethyl)tricyclo[5.2.1.0$^{2,6}$]decane and of fumaric acid and/or maleic acid (anhydride). In another preferred embodiment II the polyesters comprise the abovementioned starting components as under I with, additionally, a further acid selected from adipic acid, dodecanedioic acid and phthalic acid (anhydride), it being possible for the ratio of the $\alpha,\beta$-unsaturated acid(s) to the additional acid to vary from 2:1 to 1:4. Preferred ratios are from about 1:1 to 1:2. These polyesters generally have acid numbers of from 1 to 200 m KOH/g, preferably 1-100 mg KOH/g, more preferably 1-50 mg KOH/g, OH numbers of from 1 to 200 mg KOH/g, preferably 1-100 mg KOH/g more preferably 1-50 mg KOH/g, and a Tg of from $-30$ to $+100°$ C., preferably from $-20$ to $+80°$ C., more preferably from $-10$ to $+60°$ C.

Suitability as component B) is possessed by (meth)acrylic acid derivatives such as, for example, (meth)acryloyl chloride, glycidyl (meth)acrylate, (meth)acrylic acid and/or the low molecular mass alkyl esters and/or anhydrides thereof, alone or in a mixture. Additionally suitable are aminoalkyl and/or hydroxyalkyl (meth)acrylates whose alkyl spacers possess from one to 12, preferably from 2 to 8 and more preferably from 2 to 6 carbon atoms.

Suitable in addition are isocyanates which possess an ethylenically unsaturated moiety, such as, for example, (meth)acryloyl isocyanate, $\alpha,\alpha$-dimethyl-3-isopropenylbenzyl isocyanate, (meth)acryloylalkyl isocyanate with alkyl spacers that possess from one to 12, preferably from 2 to 3 and more preferably from 2 to 6 carbon atoms, such as, for example, methacryloylethyl isocyanate and methacryloylbutyl isocyanate. Other compounds which have proven advantageous as component B) are reaction products of aminoalkyl and/or hydroxyalkyl (meth)acrylates whose alkyl spacers possess from one to 12, preferably from 2 to 8 and more preferably from 2 to 6 carbon atoms with diisocyanates such as, for example, cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate bis(isocyanatophenyl)methane, propane diisocyanate, butane diisocyanate, pentane diisocyanate, hexane diisocyanate, such as hexamethylene diisocyanate (HDI) or 1,5-diisocyanato-2-methylpentane (MPDI), heptane diisocyanate, octane diisocyanate, nonane diisocyanate, such as 1,6-diisocyanato-2,4,4-trimethylhexane or 1,6-diisocyanato-2,2,4-trimethylhexane (TMDI), nonane triisocyanate, such as 4-isocyanatomethyl-1,8-octane diisocyanate (TIN) decane diisocyanate and triisocyanate, undecane diisocyanate and triisocyanate, dodecane diisocyanates and triisocyanates, isophorone diisocyanate (IPDI), bis(isocyanatomethylcyclohexyl)methane ($H_{12}$MDI), isocyanatomethylmethylcyclohexyl isocyanate, 2,5(2,6)-bis(isocyanatomethyl)bicyclo[2.2.1]heptane (NBDI), 1,3-bis(isocyanatomethyl)cyclohexane(1,3-$H_6$-XDI) or 1,4-bis(isocyanatomethyl)cyclohexane(1,4-$H_6$-XDI) alone or in a mixture. Examples that may be mentioned are the reaction products in a molar ratio of 1:1 of hydroxyethyl acrylate and/or hydroxyethyl methacrylate with isophorone diisocyanate and/or $H_{12}MDI$ and/or HDI.

Another preferred class of polyisocyanates are the compounds which are prepared by dimerization, trimerization, allophanatization, biuretization and/or urethanization of the simple diisocyanates and which have more than two isocyanate groups per molecule, examples being the reaction products of these simple isocyanates, such as IPDI HDI and/or HMDI, for example, with polyhydric alcohols (e.g. glycerol trimethylolpropane, pentaerythritol) and/or with polyfunctional polyamines, or the triisocyanurates which are obtainable by timerizing the simple diisocyanates, such as IPDI, HDI and HMDI, for example.

Depending on the ratio of components A) and B) to one another and on the nature of component B) compounds are obtained which are of low to high functionality Through the choice of the reactants it is also possible to set the subsequent hardness of the crosslinked film. If, for example, component A) is reacted with α,α-dimethyl-3-isopropenylbenzyl isocyanate in a molar ratio of 1:2, the resulting products are harder than through the use of (meth)acryloylethyl isocyanate and/or hydroxyethyl acrylate-hexamethylene diisocyanate adducts; the flexibility, however, is then lower. It has also been found that the reactivity of ethylenically unsaturated compounds with little steric hindrance—such as that of hydroxyethyl acrylate, for example—is higher than for those which are sterically hindered, such as α,α-dimethyl-3-isopropenylbenzyl isocyanate, for example.

The products of the components A) and B) can also be in solution in diluents. Preference is given in this case to diluents which are able to participate in the radiation-induced crosslinking reaction (and are known as reactive diluents).

Preferred reactive diluents are acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, and the analogous amides, it being possible also for styrene and/or derivatives thereof to be present to a minor extent.

Particular preference is given to phenoxyethyl acrylate, ethoxyethyl acrylate, isodecyl acrylate and isobornyl acrylate Another preferred class of radiation-reactive solvents (reaction diluents) comprises di-, tri- and/or tetraacrylates and their methacrylic analogues, which result formally from the reaction products of acrylic and/or methacrylic acid with an alcohol component, with elimination of water. As the alcohol component which is customary for this purpose use is made, for example, of ethylene glycol, 1,2-, 1,3-propanediol, diethylene, di- and tripropylene, triethylene and tetraethylene glycol, 1,2-, 1,4-butanediol, 1,3-butylethylpropanediol, 1,3-methylpropanediol, 1,5-pentanediol, 1,4-bis(hydroxymethyl)cyclohexane (cyclohexanedimethanol), glycerol, hexanediol, neopentyl glycol, trimethylolethane, trimethylolpropane, pentaerythritol, bisphenol A, B, C and F, norbornylene glycol, 1,4-benzyldimethanol, 1,4-benzyldiethanol, 2,4-dimethyl-2-ethylhexane-1,3-diol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, trimethylolpropane, 3(4),8(9)-bis(hydroxymethyl)tricyclo[5.2.1.0$^{2,6}$]decane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, hexane-1,2,6-triol, butane-1,2,4-triol, tris(β-hydroxyethyl)isocyanurate, mannitol, sorbitol, polypropylene glycols, polybutylene glycols, xylylene glycol or neopentyl glycol hydroxypivalate, alone or in mixtures.

Particular preference is given, however, to dipropylene glycol diacrylate (DPGDA) and/or tripropylene glycol diacrylate (TPGDA), hexanediol diacrylate (HDDA), trimethylolpropane triacrylate (TMPTA), alone or in a mixture.

Generally speaking, though, it is possible to use all of the reactive diluents specified in the literature as suitable for radiation-curable coating materials.

The compositions of the invention may also comprise auxiliaries and adjuvants such as, for example, inhibitors, water and/or organic solvents, neutralizing agents, surfactants, oxygen scavengers and/or free-radical scavengers, catalysts, light stabilizers, color brighteners, photosensitizers, thixotropic agents, antiskinning agents, defoamers, antistats, thickeners, thermoplastic additives, dyes, pigments, flame retardants, internal release agents, fillers and/or blowing agents.

The compositions of the invention are prepared by (semi)continuous or batchwise esterification and condensation of the starting acids and starting alcohols in a single-stage or multistage procedure This is followed by the reaction of the polyester A) with the component B). This reaction can take place in the met or in solution in a suitable reactive diluent.

The invention also provides a process for preparing radiation-curably modified unsaturated amorphous polyesters essentially consisting of A) at least one unsaturated amorphous polyester composed of at least one α,β-unsaturated dicarboxylic acid component and an alcohol component, the alcohol component being composed of a Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane it being possible for each isomer to be present in the mixture in a fraction of from 20% to 40%, the sum of the three isomers making from 90% to 100% and said mixture being present at not less than 5% in the alcohol component of the polyester, and B) at least one compound which contains at least one ethylenically unsaturated moiety with at the same time at least one moiety that is reactive toward A)

by reacting the starting components for preparing component A) at a temperature of from –150 to 270° C., preferably in an inert gas atmosphere, the inert gas having an oxygen content of less than 50 ppm, and subsequently reacting that product with component B) in the melt or in solution in a suitable reactive diluent at temperatures between 20 and 230° C., preferably between 40 and 200° C., more preferably between 50 and 180° C.

EXAMPLES

The examples which follow are intended to illustrate the invention though not to restrict its scope of application.

Starting component Dicidol mixture in an isomer ratio of approximately 1:1:1.

Example 1

Dodecanedioic acid and fumaric acid (ratio 0.6:0.4) are reacted with Dicidol in a ratio of 1:1.05 at 180° C. under a nitrogen atmosphere until the acid number is 24 mg KOH/c and the OH number is 34 mg KOH/g. For this purpose the fumaric acid is first esterified with Dicidol for an hour and then the dodecanedioic acid is added. The resin is dissolved to 50% strength in TPGDA. The OH groups of the polyester are then reacted with a 1:1 adduct of hydroxyethyl acrylate and isophorone diisocyanate at 50° C. in the presence of 0.1% of dibutyltin dilaurate until the NCO number is below 0.1%. Then the polymer content is adjusted to 50% using TPGDA.

$M_n$~2600 g/mol $M_w$~6900 g/mol, dynamic viscosity: 3480 mPa s.

USE EXAMPLE

The base resin used (UV20) was an adduct of trimethylolpropane, isophorone diisocyanate. Terathane 650 and hydroxyethyl acrylate as a 70% strength solution in TPGDA with a viscosity at 23° C. of 20.9 Pas.

|  | Formulation | |
| --- | --- | --- |
|  | A | B |
| UV 20 | 100 g | 50 g |
| Resin from example 1 | — | 50 g |
| TPGDA | 16.7 g | — |

The resin solutions A and B were admixed with Darocur 1173 (Ciba Specialty Chemicals, 1.5% based on resin solids) and applied using a coating bar to a glass plate and also to Bonder metal panels and various plastics. The films were then cured by means of UV light (medium-pressure mercury lamp, 70 W/350 nm optical filter) for about 16 seconds. The films, soluble beforehand, are no longer soluble in methyl ethyl ketone.

| Coating material | CT [μ] | EC [mm] | HK [s] | Peugeot Test (super-grade gasoline resistance, DIN EN ISO 2812-1, mod.) | MEK Test [double rubs] |
| --- | --- | --- | --- | --- | --- |
| A | 29-34 | 7 | 115 | ++ | >100 |
| B | 33-36 | 7.5 | 153 | ++ | >150 |

Crosshatch Testing on Different Substrates

| Coating material | ABS | PC | PE | PP | PS | Metal |
| --- | --- | --- | --- | --- | --- | --- |
| A | 1 | 4 | 4 | 5 | 4 | 2 |
| B | 0 | 0 | 2 | 2-3 | 1 | 0 |

0 = no delamination;
5 = complete loss of adhesion
ABS: acrylonitrile-butadiene-styrene terpolymer
EC: Erichsen cupping (DIN EN ISO 1520, mod)
HK: König pendulum hardness (DIN EN ISO 1522, mod)
PC: polycarbonate
PE: polyethylene
PP: polypropylene
PS: polystyrene
CT: coat thickness

What is claimed is:

1. A radiation-curably modified unsaturated amorphous polyester essentially comprising
   A) at least one unsaturated amorphous polyester composed of at least one α,β,-unsaturated dicarboxylic acid component and an alcohol component, the alcohol component being composed of a dicidol mixture of the isomeric compounds 3,8-bis(hydroxymethyl)tricyclo-[5.2.1.0$^{2,6}$]decane, 4,8-bis(hydroxymethyl)tri-cyclo [5.2.1.0$^{2,6}$]decane and 5,8-bis(hydroxy-methyl)tricyclo [5.2.1.0$^{2,6}$]decane, it being possible for each isomer to be present in the mixture in a fraction of from 20 to 40 mol %, the sum of the three isomers making from 90 to 100 mol % and said mixture being present at not less than 5 mol % in the alcohol component of the polyester; and
   B) at least one compound which contains at least one ethylenically unsaturated moiety with at the same time at least one moiety that is reactive toward A)
   and from 2 to 100 mol % of the OH groups of component A) being reacted with component B).

2. The radiation-curably modified unsaturated amorphous polyester as claimed in claim 1, comprising up to 10 mol % of other isomers of dicidol and/or trimeric and/or higher isomeric diols of the Diels-Alder reaction product of cyclopentadiene.

3. The radiation-curably modified unsaturated amorphous polyester as claimed in claim 1, wherein the acid component further comprises aromatic and/or aliphatic and/or cycloaliphatic monocarboxylic and/or dicarboxylic and/or polycarboxylic acids.

4. The radiation-curably modified unsaturated amorphous polyester as claimed in claim 1, wherein the acid component is composed in whole or in part of anhydrides and/or alkyl esters.

5. The radiation-curably modified unsaturated amorphous polyester as claimed in claim 1, wherein the alcohol component comprises further linear and/or branched, aliphatic and/or cycloaliphatic and/or aromatic diols and/or polyols.

6. The radiation-curably modified unsaturated amorphous polyester as claimed in claim 1, comprising citraconic, fumaric, itaconic, maleic and/or mesaconic acid as α,β,-unsaturated dicarboxylic acid.

7. The radiation-curably modified unsaturated amorphous polyester as claimed in claim 1, comprising phthalic acid, isophthalic acid, terephthalic acid, 1,4-cyclohexanedicarboxylic acid, succinic acid, sebacic acid, methyl tetrahydrophthalic acid, methylhexahydrophthalic acid, hexahydrophthalic acid, tetrahydrophthalic acid, dodecanedioic acid, adipic acid, azelaic acid, pyromellitic acid and/or trimellitic acid, their acid anhydrides and/or methyl esters, and also isononanoic acid and/or 2-ethylhexanoic acid, as additional acids.

8. The radiation-curably modified unsaturated amorphous polyester as claimed in claim 1, comprising ethylene glycol, 1,2- and/or 1,3-propanediol, diethylene, dipropylene, triethylene and/or tetraethylene glycol, 1,2- and/or 1,4-butanediol, 1,3-butylethylpropanediol, 1,3 methylpropanediol, 1,5-pentanediol, cyclohexanedimethanol, glycerol, hexanediol, neopentyl glycol, trimethylolethane, trimethylolpropane and/or pentaerythritol, bisphenol A, B, C and/or F, norbornylene glycol, 1,4-benzyldimethanol and -diethanol, 2,4-dimethyl-2-ethylhexane-1,3-diol as additional alcohols.

9. The radiation-curably modified unsaturated amorphous polyester as claimed in claim 1, wherein the alcohol component is composed of at least 20 mol % of the isomers according to claim 1.

10. The radiation-curably modified unsaturated amorphous polyester as claimed in claim 1, wherein the alcohol component is composed of at least 50 mol % of the isomers.

11. The radiation-curably modified unsaturated amorphous polyester as claimed in claim 1, wherein the alcohol component is composed of at least 90 mol % of the isomers.

12. The radiation-curably modified unsaturated amorphous polyester as claimed in claim 1, wherein the alcohol component is composed of 100 mol % of the isomers according to claim 1.

13. The radiation-curably modified unsaturated amorphous polyester as claimed in claim 1, comprising fumaric acid and/or maleic acid (anhydride) as α,β,-unsaturated acid component.

14. The radiation-curably modified unsaturated amorphous polyester as claimed in claim 1, comprising hexahydrophthalic acid, tetrahydrophthalic acid, dodecanedioic acid, adipic acid, azelaic acid, trimellitic acid (anhydride) and/or phthalic acid (anhydride) as further dicarboxylic acid component.

15. The radiation-curably modified unsaturated amorphous polyester as claimed in claim 1, comprising the alcohol component in a molar ratio of from 0.5 to 2.0:1 with respect to the acid component.

16. The radiation-curably modified unsaturated amorphous polyester as claimed in claim 1, comprising the alcohol component in a molar ratio of from 0.8 to 1.5:1 with respect to the acid component.

17. The radiation-curably modified unsaturated amorphous polyester as claimed in claim 1, comprising the alcohol component in a molar ratio of from 1.0 to 1.1:1 with respect to the acid component.

18. The radiation-curably modified unsaturated amorphous polyester as claimed in claim 1, having an acid number of between 1 and 200 mg KOH/g.

19. The radiation-curably modified unsaturated amorphous polyester as claimed in claim 1, having an OH number of between 1 and 200 mg KOH/g.

20. The radiation-curably modified unsaturated amorphous polyester as claimed in claim 1, comprising (meth)acrylic acid and/or derivatives thereof as component B).

21. The radiation-curably modified unsaturated amorphous polyester as claimed in claim 20, wherein (meth)acryloyl chloride, glycidyl (meth)acrylate, (meth)acrylic acid and/or the low molecular mass alkyl esters and/or anhydrides thereof and also hydroxyalkyl (meth)acrylates whose alkyl spacers possess from 1 to 12 carbon atoms are used, alone or in a mixture, as component B).

22. The radiation-curably modified unsaturated amorphous polyester as claimed in claim 1, wherein (meth)acryloyl isocyanate, a,a-dimethyl-3-isopropenylbenzyl isocyanate, and (meth)acryloylalkyl isocyanate, said isocyanates having alkyl spacers possessing from 1 to 12 carbon atoms, are used as component B).

23. The radiation-curably modified unsaturated amorphous polyester as claimed in claim 1, wherein reaction products of hydroxyalkyl (meth)acrylates whose alkyl spacers possess from 1 to 12 carbon atoms with diisocyanates are used as component B).

24. The radiation-curably modified unsaturated amorphous polyester as claimed in claim 23, wherein diisocyanates selected from cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate, bis(isocyanatophenyl)methane, propane diisocyanate, butane diisocyanate, pentane diisocyanate, such as hexamethylene diisocyanate (HDI), 1,5-diisocyanato-2-methylpentane (MPDI), heptane diisocyanate, octane diisocyanate, 1,6-diisocyanato-2,4,4-trimethylhexane, 1,6-diisocyanato-2,2,4-trimethylhexane (TMDI), 4-isocyanatomethyl-1,8-octane diisocyanate (TIN), decane diisocyanate and triisocyanate, undecane diisocyanate and triisocyanate, dodecane diisocyanates and triisocyanates, isophorone diisocyanate (IPDI), bis(isocyanatomethylcyclohexyl)methane ($H_{12}$MDI), isocyanatomethylmethylcyclohexyl isocyanate, 2,5(2,6)-bis(isocyanatomethyl)bicyclo[2.2.1]heptane (NBDI), 1,3-bis(isocyanatomethyl)cyclohexane(1,3-$H_6$-XDI) or 1,4-bis-(isocyanatomethyl)cyclohexane(1,4-$H_6$-XDI), alone or in a mixture, are used.

25. The radiation-curably modified unsaturated amorphous polyester as claimed in claim 24, wherein polyisocyanates prepared by dimerization, trimerization, allophanatization, biuretization and/or urethanization of simple diisocyanates are used.

26. The radiation-curably modified unsaturated amorphous polyester as claimed in claim 1, wherein the reaction products in a molar ratio of 1:1 of hydroxyethyl acrylate and/or hydroxyethyl methacrylate with isophorone diisocyanate and/or $H_{12}$MDI and/or HDI and/or TMDI are used as component B).

27. The radiation-curably modified unsaturated amorphous polyester as claimed in claim 1, wherein from 5 to 100 mol % of the OH groups of component A) are reacted with component B).

28. A radiation-curably modified unsaturated amorphous polyester as claimed in claim 1, wherein a reactive diluent is used.

29. The radiation-curably modified unsaturated amorphous polyester as claimed in claim 1, comprising acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, and also the analogous amides and/or styrene and/or derivatives thereof, alone or in mixtures, as reactive diluent(s).

30. The radiation-curably modified unsaturated amorphous polyester as claimed in claim 1, comprising phenoxyethyl acrylate, ethoxyethyl acrylate, isodecyl acrylate and isobornyl acrylate, alone or in mixtures, as reactive diluent(s).

31. The radiation-curably modified unsaturated amorphous polyester as claimed in claim 1, comprising di-, tri- and/or tetraacrylates and their methacrylate analogues, alone or in mixtures, as reactive diluent(s).

32. The radiation-curably modified unsaturated amorphous polyester as claimed in claim 1, comprising di-, tri- and/or tetraacrylates and their methacrylate analogues of ethylene glycol, 1,2-, 1,3-propanediol, diethylene, di- and tripropylene, triethylene and tetraethylene glycol, 1,2-, 1,4-butanediol, 1,3-butylethyl-propanediol, 1,3-methylpropanediol, 1,5-pentanediol, 1,4-bis(hydroxymethyl)cyclohexane (cyclohexanedimethanol), glycerol, hexanediol, neopentyl glycol, trimethylolethane, trimethylolpropane, pentaerythritol, bisphenol A, B, C and F, norbornylene glycol, 1,4-benzyldimethanol and diethanol, 2,4-dimethyl-2-ethylhexane-1,3-diol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, trimethylolpropane, 3(4),8(9)-bis(hydroxymethyl)tricyclo-[$5.2.1.0^{2,6}$]decane, 2,2-bis(4-hydroxycyclohexyl)-propane, 2,2-bis[4-(β-hydroxyethoxy)phenyl]-propane, 2-methylpropane-1,3-diol, 2-methyl-pentane-1,5-diol, 2,2,4 (2,4,4)-trimethylhexane-1,6-diol, hexane-1,2,6-triol, butane-1,2,4-triol, tris(β-hydroxyethyl)isocyanurate, mannitol, sorbitol, polypropylene glycols, polybutylene glycols, xylylene glycol or neopentyl glycol hydroxypivalate, alone or in mixtures, as reactive diluent(s).

33. The radiation-curably modified unsaturated amorphous polyester as claimed in claim 1, comprising di- and/or tripropylene glycol diacrylate, hexanediol diacrylate, trimethylolpropane triacrylate, alone or in a mixture.

34. The radiation-curably modified unsaturated amorphous polyester as claimed in claim 1, comprising auxiliaries and adjuvants.

35. The radiation-curably modified unsaturated amorphous polyester as claimed in claim 1, comprising auxiliaries and adjuvants selected from inhibitors, water and/or organic solvents, neutralizing agents, surfactants, oxygen scavengers and/or free-radical scavengers, catalysts, light stabilizers, color brighteners, photosensitizers, thixotropic agents, antiskinning agents, defoamers, antistats, thickeners, thermoplastic additives, dyes, pigments, flame retardants, internal release agents, fillers and/or blowing agents.

36. The radiation-curably modified unsaturated amorphous polyester as claimed in claim 1, wherein the alcohol component is composed of at least 90 mol % of dicidol mixture according to claim 1 and/or claim 2 and comprises fumaric acid and/or maleic acid (anhydride) in a diol/acid ratio of from 0.9 to 1.1:1.

37. The radiation-curably modified unsaturated amorphous polyester as claimed in claim 1, further comprising dodecanedioic acid, adipic acid and/or phthalic acid (anhydride) as acid component in a ratio of $\alpha,\beta$-unsaturated acid(s) to additional acid of from 3:1 to 1:4.

38. A process for preparing a radiation-curably modified unsaturated amorphous polyester essentially comprising the reaction product of
  A) at least one unsaturated amorphous polyester composed of at least one $\alpha,\beta$,-unsaturated dicarboxylic acid component and an alcohol component, the alcohol component being composed of a dicidol mixture of the isomeric compounds 3,8-bis(hydroxymethyl)tricyclo-[5.2.1.0$^{2,6}$]decane, 4,8-bis(hydroxymethyl)tricyclo [5.2.1.0$^{2,6}$]decane and 5,8-bis(hydroxymethyl)tricyclo [5.2.1.0$^{2,6}$]decane, it being possible for each isomer to be present in the mixture in a fraction of from 20 mol % to 40 mol %, the sum of the three isomers making from 90 mol % to 100 mol % and said mixture being present at not less than 5 mol % in the alcohol component of the polyester; and
  B) at least one compound which contains at least one ethylenically unsaturated moiety with at the same time at least one moiety that is reactive toward A)
  by reacting starting components for preparing component A) at a temperature of from 150 to 270° C., if desired, in an inert gas atmosphere, the inert gas having an oxygen content of less than 50 ppm, and subsequently reacting that product with component B) in the melt or in solution in a suitable reactive diluent at temperatures between 20 and 230° C., if desired in the presence of a suitable catalyst.

39. A method of treating a radiation-curable system by applying a radiation-curably modified unsaturated amorphous polyester as claimed in claim 1 using a coating bar.

40. A method of treating a radiation-curable system by applying a radiation-curably modified unsaturated amorphous polyester as claimed in claim 1 as a main, base or addition component in coating materials, adhesives, lamination systems, printing and other inks, polishes, glazes, pigment pastes, filling compounds, cosmetics articles, packaging materials and/or sealants and insulants.

41. A method of treating a radiation-curable system by applying a radiation-curably modified unsaturated amorphous polyester as claimed in claim 1 as a main, base or addition component in coating materials, adhesives, lamination systems, printing and other inks, polishes, glazes, pigment pastes, filling compounds, cosmetics articles, packaging materials and/or sealants and insulants in particular for the purpose of enhancing viscosity and adhesion properties, gloss, flow, solvent resistance, chemical resistance, curing rate, hardness, and corrosion resistance.

42. The method of treating a radiation-curable system by applying a radiation-curably modified unsaturated amorphous polyester as claimed in claim 41 as a radiation-curable adhesion-promoting additive in radiation-curable coating materials which comprise water and/or solvents or are free from organic solvents and/or water.

* * * * *